(12) United States Patent
Line et al.

(10) Patent No.: US 10,029,594 B2
(45) Date of Patent: Jul. 24, 2018

(54) SEAT SUSPENSION WITH MAXIMIZED DOWNWARD DEFLECTION FEATURE

(71) Applicant: Ford Global Technologies, LLC, Dearborn, MI (US)

(72) Inventors: Johnathan Andrew Line, Northville, MI (US); Marcos Silva Kondrad, Macomb Township, MI (US); S. M. Akbar Berry, Windsor (CA); Carol Casey, Dearborn, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 15/292,310

(22) Filed: Oct. 13, 2016

(65) Prior Publication Data

US 2018/0105086 A1   Apr. 19, 2018

(51) Int. Cl.
*A47C 7/02* (2006.01)
*B60N 2/70* (2006.01)
*B60N 2/72* (2006.01)

(52) U.S. Cl.
CPC ............ *B60N 2/7094* (2013.01); *B60N 2/72* (2013.01)

(58) Field of Classification Search
CPC .......... B60N 2/7094; B60N 2/72; B60N 2/68; B60N 2/44; B60N 2/686; B60N 2/5621; B60N 2/682; B60N 2/4228; B60R 11/00; B60R 11/0264; B60R 2011/0288; B60R 2011/0012

USPC ............ 297/452.52, 188.08, 188.12, 452.53, 297/284.1–284.4, 452.49, 344.15
See application file for complete search history.

(56) References Cited

U.S. PATENT DOCUMENTS

| | | | | |
|---|---|---|---|---|
| 4,357,005 A | * | 11/1982 | Bourke | B60N 2/7094 267/142 |
| 4,973,032 A | * | 11/1990 | Fourrey | A47C 7/30 267/105 |
| 5,409,198 A | | 4/1995 | Roick | |
| 6,412,874 B1 | | 7/2002 | Mayer | |
| 7,036,864 B2 | * | 5/2006 | Rehfuss | B60N 2/7094 267/112 |
| 7,137,669 B2 | * | 11/2006 | Nagayama | A47C 7/02 297/452.49 |
| 7,775,603 B2 | * | 8/2010 | Mundell | B60N 2/7052 297/452.52 |
| 7,794,021 B2 | | 9/2010 | Sahashi | |
| 8,662,483 B2 | | 3/2014 | Yamaguchi et al. | |
| 9,039,081 B2 | | 5/2015 | Arefi et al. | |
| 9,050,919 B2 | * | 6/2015 | Matsumoto | B60N 2/7094 |
| 9,073,468 B2 | | 7/2015 | Dixon et al. | |
| 9,108,553 B2 | | 8/2015 | Medoro et al. | |

(Continued)

*Primary Examiner* — Mark R Wendell
(74) *Attorney, Agent, or Firm* — Vichit Chea; Prive Heneveld LLP

(57) ABSTRACT

A seat assembly includes a seat frame assembly supporting a cushion carrier. A suspension system is suspended from the cushion carrier and includes one or more deflectable spring members that are fixedly coupled to a front portion of the cushion carrier at a first end and moveably coupled to a rear portion of the cushion carrier at a second end. The second end of the one or more deflectable spring members rotates on the rear portion of the cushion carrier as the suspension system moves between at-rest and flexed positions.

20 Claims, 6 Drawing Sheets

(56) References Cited

U.S. PATENT DOCUMENTS

| | | | |
|---|---|---|---|
| 9,771,009 B2 * | 9/2017 | Kijima | B60N 2/72 |
| 9,849,817 B2 * | 12/2017 | Line | B60N 2/7094 |
| 2006/0152063 A1 * | 7/2006 | Nagayama | B60N 2/1615 |
| | | | 297/452.49 |
| 2010/0001560 A1 * | 1/2010 | Gross | B60N 2/42763 |
| | | | 297/216.1 |

* cited by examiner

SEAT SUSPENSION WITH MAXIMIZED DOWNWARD DEFLECTION FEATURE

FIELD OF THE INVENTION

The present invention generally relates to a vehicle seat having a seat suspension system, and more particularly, to a vehicle seat having a seat suspension system with an improved ability to downwardly deflect under a force applied by a seat occupant.

BACKGROUND OF THE INVENTION

Traditional vehicle seating assemblies are often constructed based on size constraints of a vehicle interior, current design requirements and trends, and various comfort options. The present invention provides a robust seating arrangement with a seat suspension system that provides improved deflection in a Z-dimension for providing a more cushioned effect for a vehicle occupant.

SUMMARY OF THE INVENTION

One aspect of the present invention includes a seat having a seat frame assembly and a cushion carrier supported on the seat frame assembly. At least one spring member is fixedly coupled to a front portion of the cushion carrier and slideably coupled to a rear portion of the cushion carrier at one or more engagement hooks. The engagement hooks slide inwardly along the rear member as the spring member downwardly deflects under a load force.

Another aspect of the present invention includes a seat having a seat frame assembly and a cushion carrier supported on the seat frame assembly. The cushion carrier includes spaced-apart front and rear portions which partially define a window disposed through the cushion carrier. A suspension system having one or more spring members is suspended within the window of the cushion carrier. Each spring member is downwardly deflectable and slideably coupled to the rear portion of the cushion carrier at one or more engagement hooks.

Yet, another aspect of the present invention includes a seat having a cushion carrier. A suspension system is suspended from the cushion carrier and includes one or more deflectable spring members coupled to a front portion of the cushion carrier at a first end and moveably coupled to a rear portion of the cushion carrier at a second end. The second end of the one or more deflectable spring members rotates on the rear portion of the cushion carrier as the suspension system moves between at-rest and flexed positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
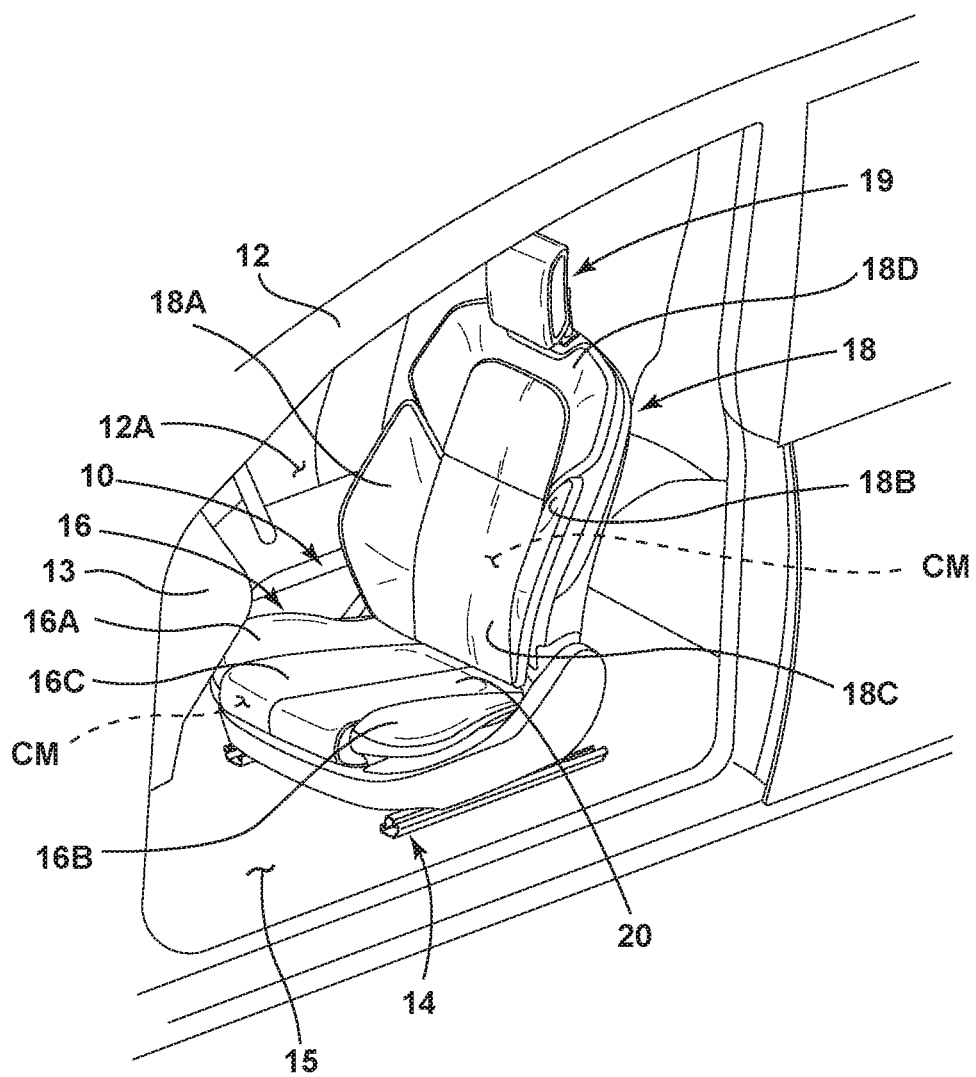
FIG. 1 is a top perspective view of a vehicle seat disposed within an interior of a vehicle.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle seat 10 is shown disposed in a vehicle 12 within an interior 12A of the vehicle 12. The vehicle seat 10 is disposed in the vehicle interior 12A adjacent to an instrument panel or dashboard 13. In FIG. 1, the vehicle seat 10 is specifically disposed in the vehicle interior 12A on a driver's side seating area. However, it is contemplated that the vehicle seat 10, or various components and features thereof, can be disposed in other areas of a vehicle interior, such as the passenger side seating area, a rear seating area, or a third row seating area. The vehicle seat 10 is supported on a track system 14 disposed on a vehicle floor support surface 15, and generally includes a substantially horizontal seat portion 16 and a substantially upright seatback 18. A headrest assembly 19 is disposed on an upper portion of the seatback 18. It is contemplated that the seatback 18 is a pivoting member configured for pivotal movement relative to the seat portion 16. The seat portion 16 generally includes a central support portion 16C having protruding fins or side supports 16A, 16B disposed on opposite sides thereof. The side supports 16A, 16B are generally disposed at an inward angle directed towards the central support portion 16C which is generally angled in a car rearward direction. The side supports 16A, 16B are configured to provide support for a vehicle occupant as seated in the vehicle seat 10 when the vehicle 12 is in motion. Similarly, the seatback 18 includes side supports 18A, 18B and an upper collar portion 18D. The side supports 18A, 18B and the upper collar portion 18D are generally angled towards a central support portion 18C of the seatback 18. The various parts of the seat portion 16 and seatback 18 are shown in FIG. 1 covered with an upholstered seat cover 20 that covers various cushion materials CM used to provide increased cushioned support for a vehicle occupant. The seat cover 20 is contemplated to be comprised of a suitable natural or synthetic material, or any combination thereof, that is used to generally cover the cushion material CM of the vehicle seat 10. Together, the cushion material CM and seat cover 20 cover and substantially conceal a vehicle seat frame assembly 22 (FIG. 2), as further described below.

Figure 2:
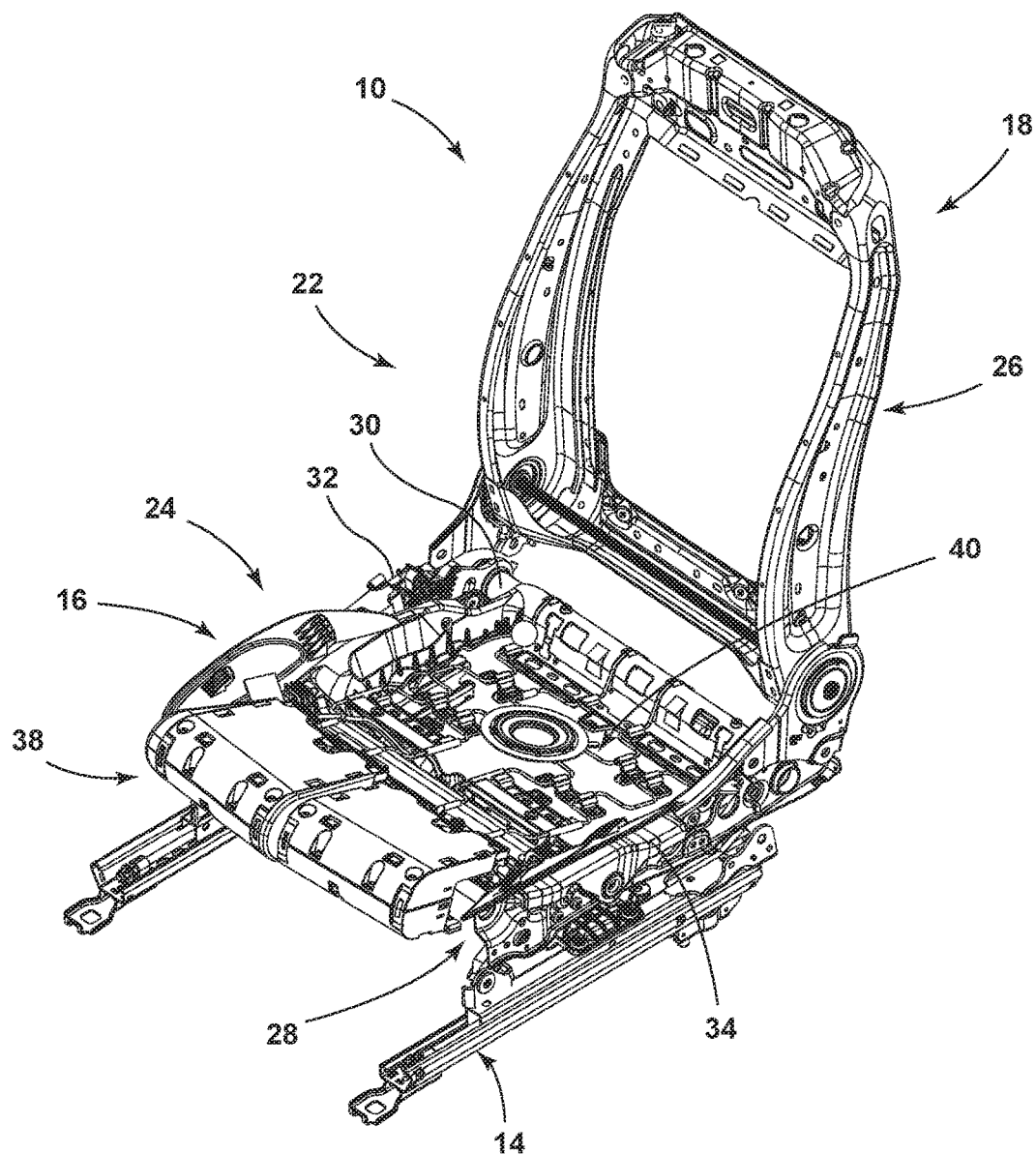
FIG. 2 is a top perspective view of the vehicle seat of FIG. 1 with cushion materials removed therefrom to reveal a vehicle seat frame assembly having a seat frame assembly and a seatback frame assembly.

Referring now to FIG. 2, the vehicle seat 10 is shown with the cushion material CM and seat cover 20 (FIG. 1) removed therefrom to reveal a vehicle seat frame assembly 22. The vehicle seat frame assembly 22 generally includes a seat frame assembly 24 and a seatback frame assembly 26 that is pivotally coupled to the seat frame assembly 24. In use, the seat frame assembly 24 supports the seat portion 16 of the vehicle seat 10, while the seatback frame assembly 26 supports the seatback 18 of the vehicle seat 10. The seat frame assembly 24 includes a front support member 28 and a rear support member 30 which interconnect spaced-apart first and second side supports 32, 34. The front and rear support members 28, 30 are more specifically defined as cross members in the form of torsion tubes which, together with the first and second side supports 32, 34, substantially carry the load of the vehicle seat 10 when the vehicle seat 10 is occupied by a passenger. The first and second side supports 32, 34 are generally upright members which are coupled to the track system 14 and which are further coupled to the seatback frame assembly 26. As further shown in FIG. 2, the seat frame assembly 24 supports a cushion carrier 38 which includes a suspension system 40.

Figure 3:
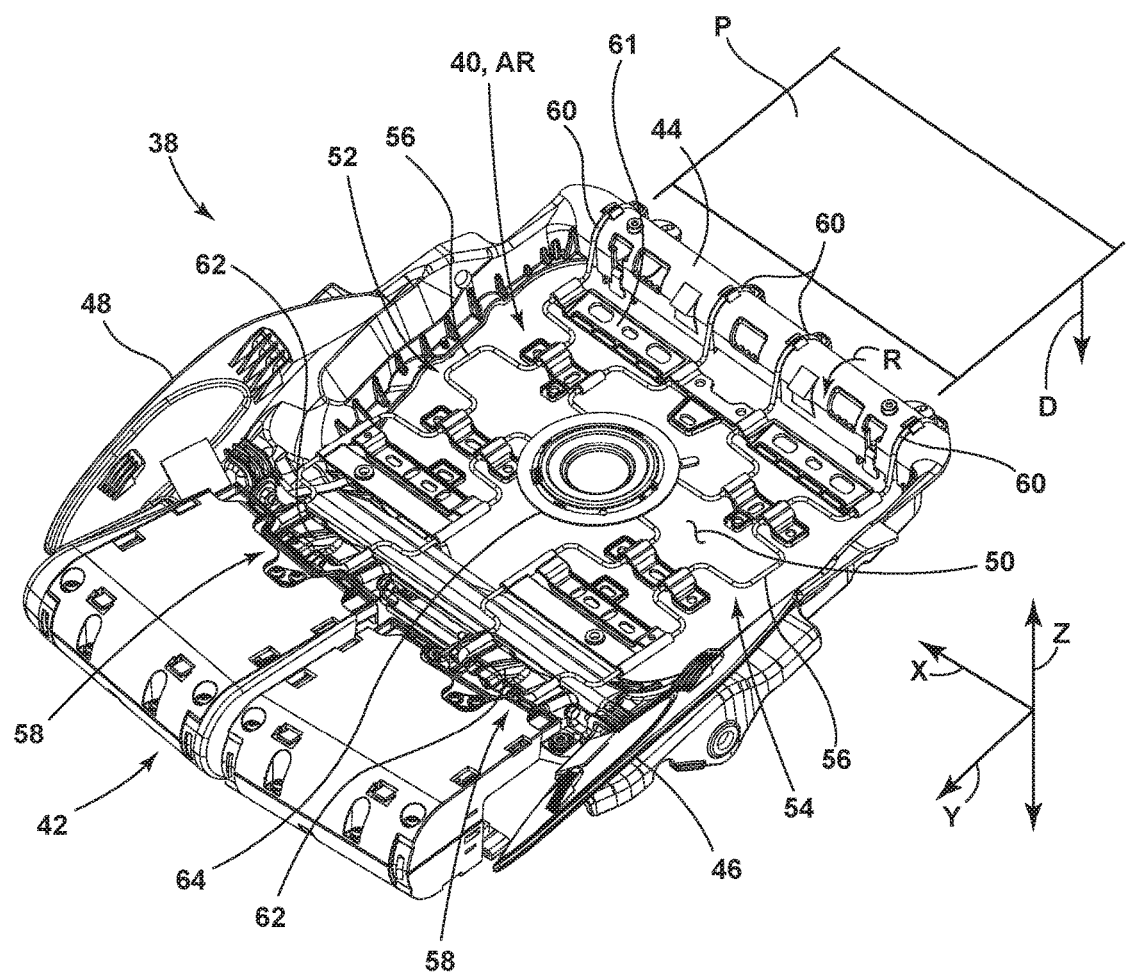
FIG. 3 is a top perspective view of a cushion carrier and suspension system.

Referring now to FIG. 3, the cushion carrier 38 of FIG. 2 is shown as removed from the vehicle seat frame assembly 22. The cushion carrier 38 includes a front portion 42 and a rear portion 44 which are interconnected by spaced-apart first and second side members 46, 48 to define a window 50 positioned in a generally central location of the cushion carrier 38. As shown in the embodiment of FIG. 3, the window 50 is a substantially square-shaped window, however, other shapes for the window 50 are also contemplated. The suspension system 40 is suspended in the window 50 of the cushion carrier 38. The suspension system 40 is contemplated to flex and extend below a plane P defined by the window 50 of the cushion carrier 38 in a direction indicated by arrow D when supporting a vehicle occupant thereon. Thus, the suspension system 40 is configured to extend below the seat frame assembly 24 in a flexed position F (FIGS. 4D and 4E) when a downward load force LF is realized on the suspension system 40. In FIG. 3, the suspension system 40 is shown in an at-rest position AR. In use, the front portion 42 of the cushion carrier 38 is used to support a vehicle occupant at or around the thighs of the vehicle occupant and is generally supported by the front support member 28 of the seat frame assembly 24. The rear portion 44 of the cushion carrier 38 is used to couple the cushion carrier 38 to the rear support member 30 of the seat frame assembly 24, as further described below. The suspension system 40 of the cushion carrier 38 is configured to support a vehicle occupant at or around the buttocks area of the vehicle occupant. The load supported by the suspension system 40 causes the suspension system 40 to downwardly deflect in the direction as indicated by arrow D. Arrow D illustrates a generally downward direction for the suspension system 40 to flex from the at-rest position AR. This downward direction is commonly referred to as a vertical or Z-dimension deflection as indicated in FIG. 3.

Figure 4A:
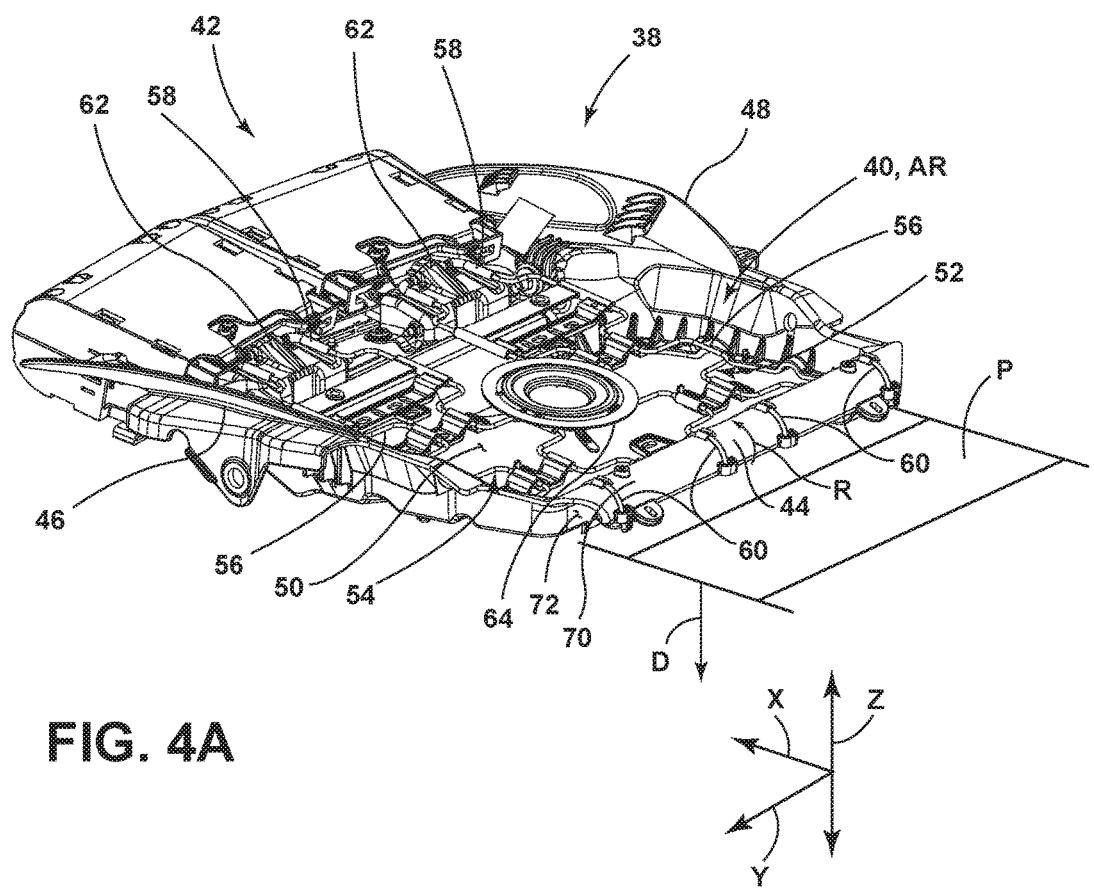
FIG. 4A is a rear perspective view of the cushion carrier and suspension system of FIG. 3.

The suspension system 40 includes first and second spring members 52, 54 which each include serpentine body portions 56 which interconnect front portions 58 with rear engagement hooks 60. The front portions 58 of the first and second spring members 52, 54 are coupled to the front portion 42 of the cushion carrier 38 at mounting hooks 62. The front portions are contemplated to be fixedly coupled to the front portion 42 of the cushion carrier 38. The engagement hooks 60 are coupled to the rear portion 44 of the cushion carrier 38 in a sliding or rotating arrangement with the rear portion 44, as further described below. In the embodiment shown in FIG. 3, the first and second spring members 52, 54 are interconnected by a bracket assembly 64 which may be used to route wiring or air passageways for various seat controls and comfort features. The first and second spring members 52, 54 are further interconnected by a rear bracket assembly 61 disposed adjacent to the engagement hooks 60. The first and second spring members 52, 54 are flexibly resilient spring members which are adapted for deflection in the Z dimension along the path as indicated by arrow D given the coiled serpentine body portions 56 thereof. The first and second spring members 52, 54 are configured to revert to the at-rest position AR shown in FIG. 3 when a load force is removed therefrom, such as when a vehicle occupant is no longer seated in the vehicle seat 10. The engagement hooks 60 are configured to rotate or slide as moveably or flexibly coupled to the rear portion 44 of the cushion carrier 38 in a direction as indicated by arrow R to augment Z-dimension deflection of the suspension system 40 along the path as indicated by arrow D. This pivoting connection of the engagement hooks 60 with the rear portion 44 of the cushion carrier 38 provides a maximized Z-dimension deflection of the suspension system 40 as compared to a suspension system which includes fixed connections between both the front and rear portions 42, 44 of the seat cushion carrier 38. As shown in FIG. 3, the serpentine body portions 56 of the first and second spring members 52, 54 comprise generally tubular wires which may be made from a metallic material such as spring steel. The suspended coupling of the suspension system 40 within the window 50 of the cushion carrier 38 is further exemplified in FIG. 4A. In the rear perspective view of FIG. 4A, the rear portion 44 of the cushion carrier 38 is shown having a curved or rounded body portion 70 defining a cavity 72 thereunder. The rear support member 30 of the seat frame assembly 24 is received in the cavity 72 as shown in FIGS. 2, 4B and 4D.

Figure 4B:
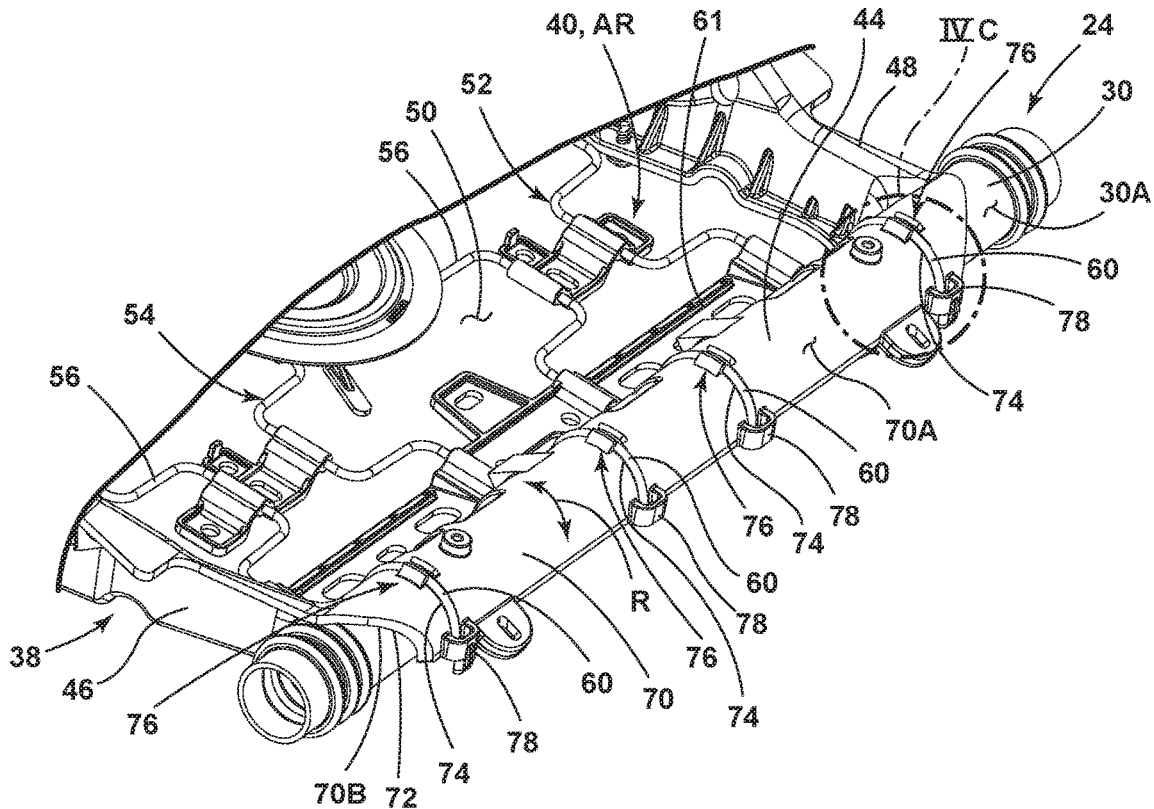
FIG. 4B is a close up view of a rear portion of the cushion carrier and suspension system of FIG. 4A.

Referring now to FIG. 4B, the rear support member 30 of the seat frame assembly 24 is shown received within the cavity 72 of the body portion 70 of the rear portion 44 of the cushion carrier 38. The curvature of the body portion 70 of the rear portion 44 provides a close engagement of a rounded under surface 70B of the rear portion 44 with the round outer surface 30A of the rear support member 30. Thus, the rear portion 44 of the cushion carrier 38 is contemplated to be a polymeric overmold part configured for close engagement with the rear support member 30 of the seat frame assembly 24. As fixedly coupled to the rear support member 30, the rear portion 44 of the cushion carrier 38 is specifically configured to provide sliding or pivoting engagement of the engagement hooks 60 of the first and second spring members 52, 54. Specifically, an outer surface 70A of the rear portion 44 includes a plurality of channels 74 in which the engagement hooks 60 are slideably received. The engagement hooks 60 are retained within the channels 74 by retainer members 76 and guides 78. In use, the retainer members 76 and guides 78 retain the engagement hooks 60 in a sliding engagement with the rear portion 44 of the cushion carrier 38 as the engagement hooks 60 move along the path as indicated by arrow R.

Figure 4C:
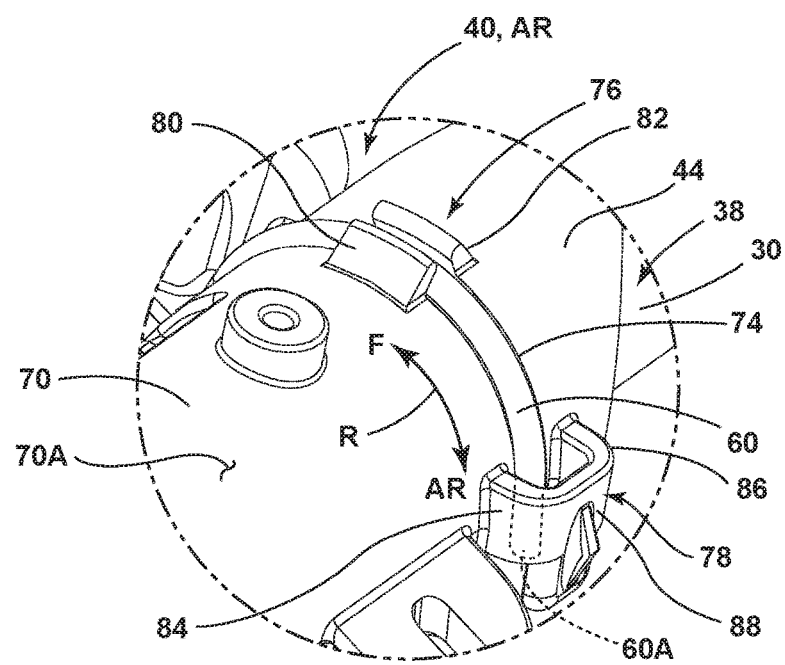
FIG. 4C is a close up view of a portion of the cushion carrier and suspension system of FIG. 4B taken at location IVC.

Referring now to FIG. 4C, an engagement hook 60 is shown disposed within a channel 74 of the rear portion 44 of the cushion carrier 38. The engagement hook 60 shown in FIG. 4C is exemplary of all the engagement hooks 60 shown in FIG. 4B. Further, it is contemplated that the suspension system 40 of the present concept may include more than two spring members, and may also include spring members having various configurations that differ from first and second spring members 52, 54 described above. In FIG. 4C, engagement hook 60 is shown retained by retainer member 76 which includes first and second tabs 80, 82 which essentially define a clip that extends over the channel 74 in which the engagement hook 60 is slideably disposed. The engagement hook 60 further includes an end 60A which is disposed within a guide 78. The guide 78 is comprised of outwardly first and second extending legs 84, 86 which are interconnected by a middle portion 88 disposed over the outwardly opening channel 74. The outwardly extending legs 84, 86 are disposed on opposite sides of the channel 74 and extend outwardly from the outer surface 70A of the body portion 70 of the rear portion 44 of the cushion carrier 38. By covering the channel 74, the guide 78 ensures that the end 60A of the engagement hook 60 remains engaged with the channel 74 as the engagement hook 60 slides along the channel 74 in the direction as indicated by arrow R as a suspension system 40 moves from the at-rest position AR to a flex position F (FIG. 4D).

Figure 4D:
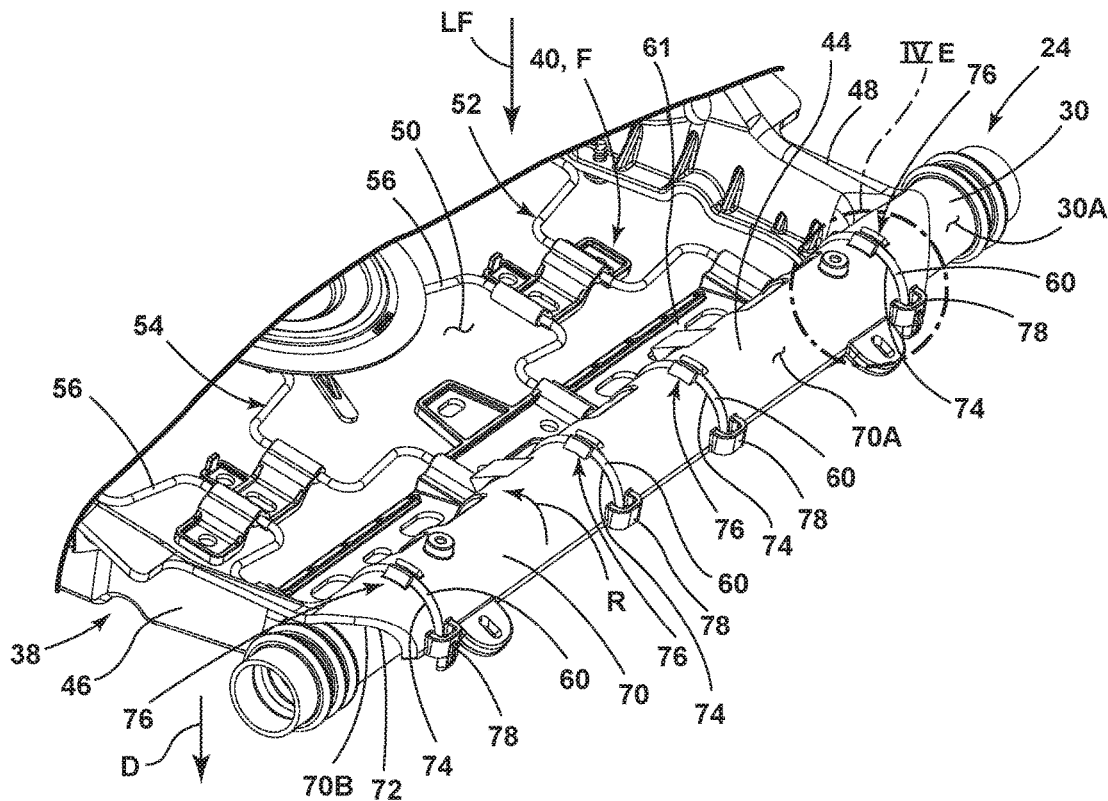
FIG. 4D is a close up view of the rear portion of the cushion carrier and suspension system of FIG. 4A with the suspension system in a flexed position.

Referring now to FIG. 4D, the suspension system 40 is shown in a flexed position F, wherein the suspension system 40 has downwardly deflected along the path as indicated by arrow D due to a load force LF acting on the suspension system 40. The load force LF is contemplated to illustrate a load of a vehicle occupant seated in the vehicle seat 10 (FIG. 1) which downwardly deflects the suspension system 40. Specifically, when the suspension system 40 is deflected in the Z-dimension, the first and second spring members 52, 54 flex and stretch downwardly to cushion the vehicle occupant as seated on the vehicle seat 10. Further, with the suspension system 40 of the present concept, the engagement hooks 60 pivot or rotate inwardly towards the window 50 along the path as indicated by arrow R within the channels 74 of the rear portion 44 of the cushion carrier 38.

Figure 4E:
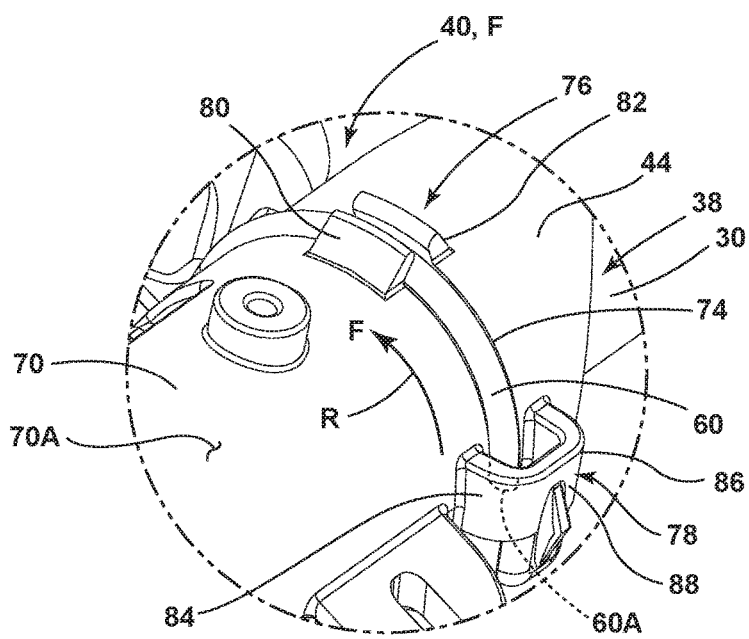
FIG. 4E is a close up view of a portion of the cushion carrier and suspension system of FIG. 4D taken at location WE.

Referring now to FIG. 4E, the engagement hook 60 has moved or rotated inwardly in the direction as indicated by arrow R as the suspension system 40 has moved from the at-rest position AR (FIG. 4B) to the flexed position F. Thus, with reference to FIG. 4C, the end 60A of the engagement hook 60 has rotated inwardly along a length of channel 74 to provide further downward deflection of the suspension system 40 in the Z-dimension. As shown in FIG. 4E, the end 60A of the engagement hook 60 is still contained by the guide 78 as disposed over the channel 74 in which the engagement hook 60 is slideably received. Further, with the suspension system 40 in the flexed position F, the engagement hook 60 is still retained by the retainer member 76 via first and second tabs 80, 82 which extend over the channel 74.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seat, comprising:
   a cushion carrier supported on a seat frame assembly; and
   a spring member having one or more engagement hooks slideably coupled to a rear portion of the cushion carrier for inwardly sliding along the rear portion of the cushion carrier as the spring member downwardly deflects under a load force, wherein the spring member is further fixedly coupled to a front portion of the cushion carrier.

2. The seat of claim 1, wherein the seat frame assembly includes a rear support member.

3. The seat of claim 2, wherein the rear portion of the cushion carrier is coupled to the rear support member of the frame assembly.

4. The seat of claim 1, wherein the rear portion of the cushion carrier includes one or more channels disposed thereon, and further wherein the one or more engagement hooks of the spring member are slideably received in respective channels of the one or more channels of the rear portion of the cushion carrier.

5. The seat of claim 4, including:
a retainer member disposed over each channel of the one or more channels for retaining the one or more engagement hooks within the respective channels of the one or more channels.

6. The seat of claim 5, wherein each retainer member includes first and second tabs disposed on opposite sides of the channel and outwardly extending from an outer surface of the rear portion of the cushion carrier over the one or more channels.

7. The seat of claim 4, including:
a guide disposed over each channel of the one or more channels for retaining the engagement hooks within the respective channels of the one or more channels.

8. The seat of claim 7, wherein the each guide includes first and second legs outwardly extending from an outer surface of the rear portion of the cushion carrier on opposite side of the respective channels of the one or more channels, and further wherein the guide includes a middle portion interconnecting the first and second legs over the respective channels of the one or more channels.

9. A seat, comprising:
a seat frame assembly;
a cushion carrier supported on the seat frame assembly and having spaced-apart front and rear portions partially defining a window disposed therethrough; and
a suspension system having one or more spring members suspended within the window, wherein each spring member includes one or more hooks slideably coupled to the rear portion of the cushion carrier, and further wherein each spring member is downwardly deflectable within the window.

10. The seat of claim 9, wherein the seat frame assembly includes a rear support member.

11. The seat of claim 10, wherein the rear portion of the cushion carrier includes a curved body portion which defines a cavity thereunder in which the rear support member of the frame assembly is received.

12. The seat of claim 9, wherein the rear portion of the cushion carrier includes one or more channels disposed along a curved body portion thereof.

13. The seat of claim 12, wherein the one or more engagement hooks of the one or more spring members are slideably received in the one or more channels of the rear portion of the cushion carrier for movement along a length of the one or more channels.

14. The seat of claim 13, wherein the one or more engagement hooks of the one or more spring members rotate along the length of the one or more channels as the suspension system moves between at-rest and flexed positions.

15. The seat of claim 14, wherein the one or more spring members deflect below a plane defined by the window of the cushion carrier when the suspension system is in the flexed position.

16. A seat, comprising:
a cushion carrier; and
a suspension system suspended from the cushion carrier having a spring member coupled to a front portion of the cushion carrier at a first end and moveably coupled to a rear portion of the cushion carrier at a second end, wherein the second end of the spring member rotates along the rear portion of the cushion carrier as the suspension system moves between at-rest and downwardly flexed positions.

17. The seat of claim 16, wherein the suspension system is suspended within a window defined by the cushion carrier, and further wherein the spring member deflects below a plane defined by the window of the cushion carrier when the suspension system is in the downwardly flexed position.

18. The seat of claim 16, wherein the first end of the spring members is fixedly coupled to the front portion of the cushion carrier.

19. The seat of claim 16, wherein the second end of spring member includes one or more engagement hooks slideably received in channels disposed on the rear portion of the cushion carrier.

20. The seat of claim 19, wherein the one or more engagement hooks rotate inwardly along the channels of the rear portion of the cushion carrier as the suspension system moves from the at-rest position to the flexed position.

* * * * *